United States Patent [19]
Loew

[11] 3,959,538
[45] May 25, 1976

[54] DECORATIVE PLASTIC TRIM

[75] Inventor: Theodore Loew, Schenectady, N.Y.

[73] Assignee: The Standard Products Company, Cleveland, Ohio

[22] Filed: Mar. 21, 1975

[21] Appl. No.: 560,782

Related U.S. Application Data

[62] Division of Ser. No. 213,435, Dec. 29, 1971, abandoned.

[52] U.S. Cl. ................................ 428/31; 428/81; 428/192; 156/211; 156/258; 52/716; 296/1 R
[51] Int. Cl.² .................. B32B 1/04; B32B 31/00; E04F 19/02; B60J 9/00
[58] Field of Search ............... 428/31, 81, 192; 156/211, 257, 258; 296/1 R; 52/716; 49/460, 462

[56] References Cited
UNITED STATES PATENTS

| | | | |
|---|---|---|---|
| 2,293,751 | 8/1942 | May | 156/211 |
| 2,972,789 | 2/1961 | Mathues | 156/257 X |
| 3,262,136 | 7/1966 | Sevcik | 156/257 X |
| 3,310,928 | 3/1967 | Weimar | 52/716 |
| 3,711,360 | 1/1973 | Kent | 428/81 |
| 3,720,567 | 3/1973 | Shanok et al. | 428/31 |

*Primary Examiner*—Philip Dier
*Attorney, Agent, or Firm*—Meyer, Tilberry & Body

[57] ABSTRACT

Contoured end structures are disclosed for trim strips of the character particularly suited for mounting on an automobile to provide protective and decorative interior or exterior trim for the vehicle. The end structures have various configurations and are produced by removing a portion of the trim strip material between side portions thereof to define V-shaped notches or recesses and then deforming the remaining portions of the trim strip adjacent the recess to close the recess and bring laterally opposite edges thereof into juxtapositional relationship. The juxtaposed edges are then bonded by heat sealing to complete the forming operation.

6 Claims, 17 Drawing Figures

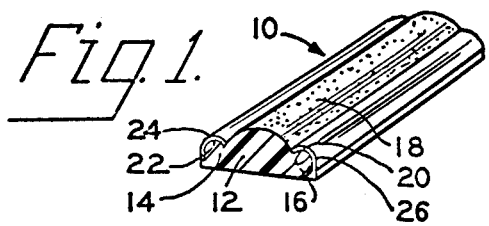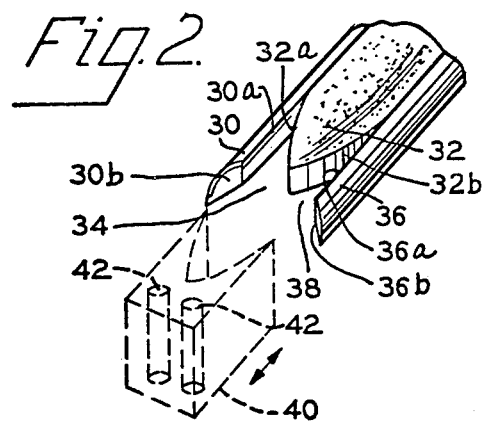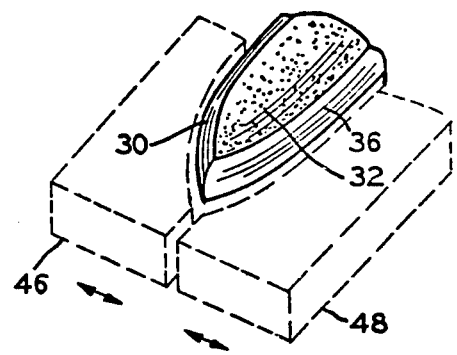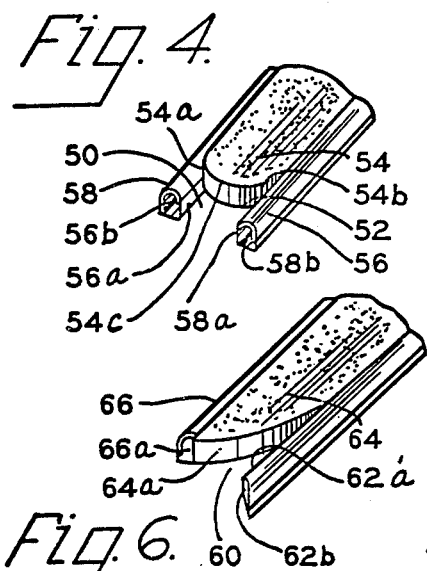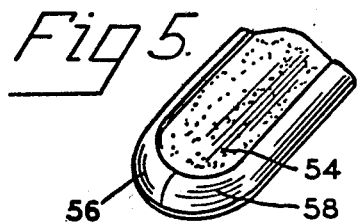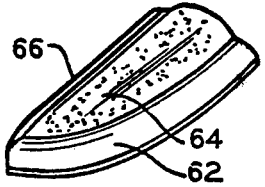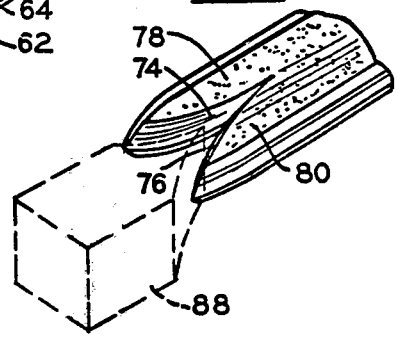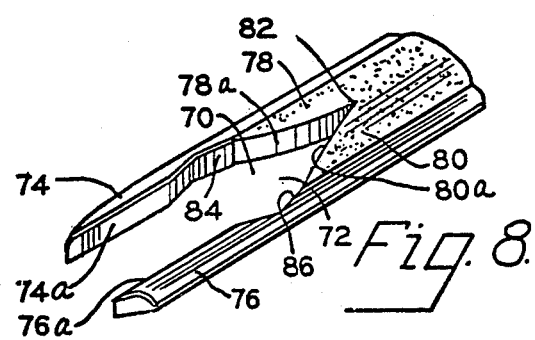

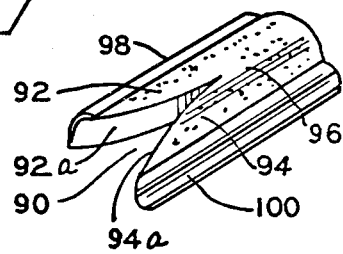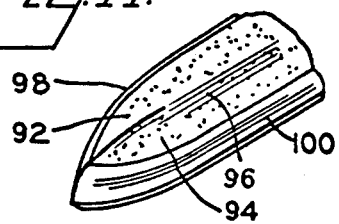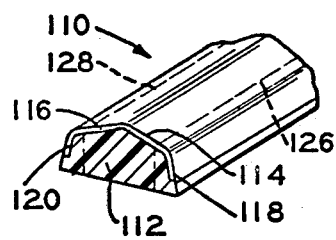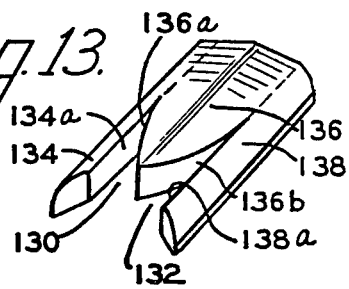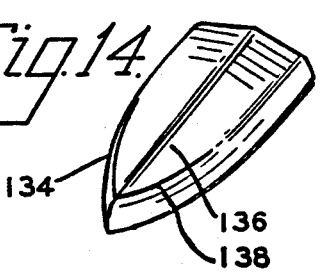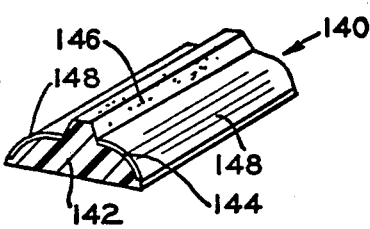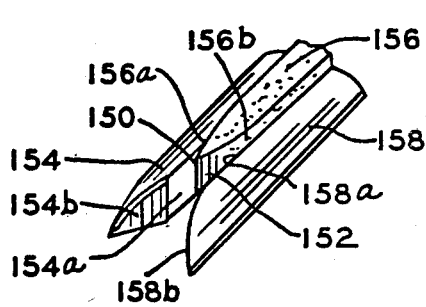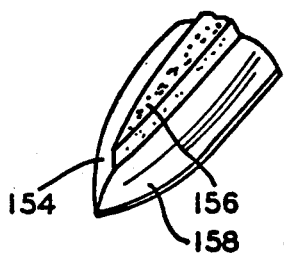

DECORATIVE PLASTIC TRIM

This is a division of application Ser. No. 213,435 filed Dec. 29, 1971, now abandoned.

This invention relates to the art of trim strips and, more particularly, to the forming of contoured end finishes or end structures for trim strips.

Plastic trim strips have been provided heretofore which are adapted to be mounted on an underlying surface to provide decorative and/or protective trim for the article on which they are mounted. While many articles such as tables, counters, desks and luggage are trimmed in this manner, one of the most prominent uses of trim strip of this character today is in conjunction with automobiles. For example, exterior fender and door panels of vehicles are provided with elongated trim strip sections to protect the vehicle panel against denting and scratching thereof such as might occur when an adjacent car door is opened thereagainst and to provide a decorative stripe or strips extending along the side of the vehicle.

Plastic trim strips of the foregoing character may have any one of a variety of cross-sectional configurations designed to provide for the strip to project outwardly from the underlying surface to provide the desired protective function and at the same time to provide the strip with a decorative appearance. More particularly, such strips include a body portion having an inner surface by which the strip is adapted to be adhesively or otherwise mounted on an underlying support surface and an outer surface having a desired contour to provide decorative and/or protective functions. The outer surface may be provided with decorative means to further enhance the decorative appearance resulting from the contour thereof. For example, the outer surface of the trim strip may be convex in contour and may be provided with a longitudinally coextensive film of metallized polyethylene terephthalate extending laterally thereacross, whereby the plastic trim strip has the appearance of a metal strip. As another example, the trim strip may be contoured in cross section to define a convex intermediate portion bounded on its opposite sides by wider or narrower side portions having a convex or other configuration and which side portions are covered with a thin film of metallized polyethylene terephthalate, whereby the strip has the appearance of a metallic strip carrying an intermediate plastic bumper strip, or a plastic trim strip having narrow metal stripes along the opposite side edges thereof. Moreover, the plastic portion of the trim strip intermediate the metal appearing portions may be provided with decorative surface means. For example, a grained appearance can be achieved by introducing impressions into the plastic surface during the forming thereof, or by covering the intermediate portion of the trim strip with a thin plastic film having a wood grain or like pattern pre-printed thereon. Yet another example of a decorative appearance could be defined by covering the intermediate portion of the trim strip with a thin film of metallized polyethylene terephthalate as opposed to covering the side portions of the strip. It will be appreciated that many trim strip cross-sectional configurations are possible and that a wide variety of possibilities exist for imparting a decorative appearance to a trim strip having a given cross-sectional configuration.

Trim strips of the foregoing character are generally produced by extruding the plastic material in an elongated continuous strip which is cut to provide strips of desired length for use, or which is wound or coiled on a spool or the like from which desired lengths can be withdrawn and cut when needed. Further, the extrusion provides the desired cross-sectional configuration for the strip and if materials such as films of metallized polyethylene terephthalate are to be associated with the extruded strip to further accentuate the decorative appearance provided by the cross-sectional contour, this can be achieved as the strip leaves the extrusion device. Further, pressure sensitive adhesive may be applied to the underside of the trim strip as it leaves the extrusion device so that the strip when cut in desired lengths or when wound on a reel is ready for mounting on an underlying support surface. If the strip is to be adhesively mounted on an underlying support surface it is not necessary, of course, to apply the adhesive thereto during the strip forming operation. Further, trim strips of this nature can be dielectrically bonded or attached by fastener elements such as screws to an underlying support surface in which cases no adhesive would be required.

When trim strips of the foregoing character are cut to length and mounted on an underlying support surface such as that defined by side and door panels of a vehicle, it is desirable to provide for the opposite ends of the strip to have a contoured finish which lends to the decorative appearance provided by the portions of the strip intermediate the opposite ends. Heretofore, the ends of such trim strips have simply been cut along a transverse line perpendicular to the longitudinal axis of the strip and, sometimes, the cut is along a plane inclined with respect to the longitudinal axis giving the end a tapered appearance. While end forming of the latter character may be acceptable under certain circumstances, it remains that the decorative appearance of the strip as a whole is detracted from by such an abrupt termination. Moreover, the decorative appearance of the strip may be further detracted from by such an abrupt termination depending on the particular cross-sectional contour of the strip and the manner in which it is provided with a decorative outer surface. In any event, any detraction from the decorative appearance of the trim strip is objectionable and is not well received by automotive manufacturers who apply such strips to their vehicle or by the public who buys the vehicles or has such trim strip applied to an existing vehicle or other article which is to be protected and/or decorated.

In view of the foregoing, it will be appreciated that it becomes desirable to provide trim strips with finished end structures which lend to the decorative appearance of the strip as opposed to detracting from such appearance. Moreover, it becomes desirable to provide such trim strips with a variety of decorative end finishes, thus to provide automotive manufacturers or the general public with a number of different end finishes to select from. Such a variety of desirable end finishes is provided in accordance with the present invention. In this respect, elongated trim strips having structural characteristics including those described hereinabove advantageously can be provided with any one of a wide variety of contoured end finishes including, for example, a pointed end, a round end, a square end, a fish-tail end, and many others, and in any one of which end finishes the decorative appearance of the trim strip ahead of the end finish is advantageously maintained throughout the end finish.

In accordance with one aspect of the present invention, the foregoing end finish structures, and others, are formed by removing a portion of the trim strip material to provide for remaining portions of the trim strip material to define a recess having at least two edges. The remaining portions of the trim strip material are displaced relative to one another to bring the two edges of the recess substantially into juxtaposed relationship, and the remaining portions of the trim strip material are then suitably interconnected. Thus, the juxtaposed edges are retained in juxtaposed relationship and the displaced portions of the trim strip are retained in their displaced disposition to define a desired end finish contour. The removal of trim strip material to define the recess may be achieved in any suitable manner such as by cutting the material of the trim strip. Further, the interconnection of the remaining portions of the trim strip defining the recess can be achieved in any suitable manner such as by bonding or the use of fasteners and, preferably, is achieved by heat sealing the juxtaposed edges together. Preferably, the strip material is heated prior to displacement of the trim strip portions either to facilitate such displacement or to facilitate both the displacement and heat sealing of the juxtaposed edges when heat sealing is employed. It will be appreciated, of course, that when heat sealing is employed, the displacement of the side portions can be achieved without heat and the strip heated thereafter to achieve heat sealing. Heating of the trim strip material can be achieved by any desired heating means such as, for example, a heating block having a contour corresponding to that of the recess and which is disposed in close proximity to or in engagement with the edges of the recess for the necessary period of time to elevate the temperature of the trim strip to the desired temperature for displacement or displacement and heat sealing. Displacement of the trim strip portions to bring the recess edges into juxtaposition for heat sealing can be achieved by hand displacement of the parts or by the use of appropriately contoured forming blocks movable into engagement with the trim strip portions from opposite sides thereof or longitudinally thereof, for example. Preferably, pressure is applied to the trim strip portions during the heat sealing operation to assure a good bond and avoid undesirable spaces or gaps between the bonded edges along the length thereof. If necessary, the finished end may be trimmed after the heat sealing operation to remove any excess plastic material which may exude from between the edges as a result of applied pressure.

Trim strips adapted to have end finishes formed thereon in accordance with the present invention may have any desired cross-sectonal configuration, as mentioned hereinabove, and may be produced from any suitable plastic material. Plastic materials for purposes of the present invention are organic materials that can be easily molded or shaped by mechanical or chemical action to give tough, non-crystalline substances that are solid at ambient temperatures. Synthetic resins and cellulose derivitives are the largest sources of such material. Trim strips of the character described hereinabove generally are produced from a thermoplastic vinyl polymeric composition, and polyvinyl chloride is the preferred material for such trim strips. Regardless of the transverse contour of the outer surface of the trim strip, the strip has a cross-sectional configuration which includes side portions and an intermediate portion laterally between the side portions. The trim strip may have a transversely continuous and smooth outer surface in which case the side portions and intermediate portion are defined by imaginery lines generally parallel to the longitudinal side edges of the trim strip. In other instances, the trim strip may have a cross-sectional configuration in which the side portions and intermediate portion are readily distinguishable by lines of juncture therebetween resulting from the cross-sectional contour. In any event, a trim strip is adapted to be cut and formed in accordance with the present invention in a manner whereby a most desirable blend of the side and intermediate portions is provided for a given trim strip so that the decorative appearance of the strip ahead of the end finish is maintained throughout the end finish.

An outstanding object of the present invention is the provision of an end finish for a trim strip in which the decorative appearance of the trim strip ahead of the end finish is continued throughout the end finish.

Another object of the present invention is the provision of plastic trim strip end finishes which provide for a terminal end of a trim strip to have a more decorative appearance than heretofore possible.

Another object of the present invention is the provision of plastic trim strip end finishes in which adjacent portions of the plastic material have a line or lines of juncture therebetween which advantageously are not readily visible.

Yet another object of the present invention is the provision of a method of forming plastic trim strip end finishes by which any one of a number of end finished contours can be provided for a trim strip.

A further object of the present invention is the provision of a method of forming trim strip ends which provides for the decorative appearance of a trim strip ahead of the formed end to be continued throughout the end finish.

Still another object of the present invention is the provision of a method of forming trim strip end finishes which is economical and readily adaptable to the forming of trim strips having various cross-sectional configurations.

Yet a further object of the present invention is the provision of a method of forming trim strip end finishes in which portions of the end of the formed trim strip have a line or lines of juncture therebetween which are not readily visible, whereby the decorative appearance of the end finish is further enhanced.

The foregoing objects, and others, will in part be obvious and in part pointed out more fully hereinafter in conjunction with the description of the drawings illustrating preferred embodiments of the present invention and in which: , FIG. 1 is a perspective view of a trim strip adapted to be provided with end finishes in accordance with the present invention;

FIGS. 2 and 3 are perspective views illustrating the manner in which an end finish is provided for the trim strip of FIG. 1;

FIGS. 4 and 5 are perspective views illustrating the manner in which another end finish is formed on the trim strip of FIG. 1;

FIGS. 6 and 7 are perspective views illustrating the manner in which yet another finished end is formed on the trim strip of FIG. 1;

FIGS. 8 and 9 are perspective views illustrating the manner in which still another end finish is formed on the trim strip of FIG. 1;

FIGS. 10 and 11 are perspective views illustrating the manner in which another end finish is formed on the trim strip of FIG. 1;

FIG. 12 is a perspective view of the structure of another trim strip adapted to be provided with end finishes in accordance with the present invention;

FIGS. 13 and 14 are perspective views illustrating the manner in which an end finish is formed on the trim strip illustrated in FIG. 12;

FIG. 15 is a perspective view of yet another trim strip structure adapted to be provided with end finishes in accordance with the present invention; and FIGS. 16 and 17 are perspective views illustrating the manner in which an end finish is formed on the trim strip of FIG. 15.

Referring now to the drawings in greater detail wherein the showings are for the purpose of illustrating preferred embodiments of the invention only and not for the purpose of limiting the same, a trim strip 10 is illustrated in FIG. 1 which may, for example, be an extruded vinyl component. The trim strip includes an intermediate portion 12 and side portions 14 and 16 extending along opposite sides of the intermediate portion. In this instance, intermediate portion 12 is illustrated as having a convex outer surface 18 and side portions 14 and 16 are illustrated as having convex outer surfaces 20 and 22 respectively. It will be appreciated that outer surfaces 18, 20 and 22 could be impressed with a grained structure or other impressed design to provide the trim strip with a decorative appearance. In the embodiment illustrated, however, the decorative appearance is provided by covering surfaces 20 and 22 with corresponding films 24 and 26 of metalized polyethylene terephthalate and impressing the plastic material of outer surface 18 of the intermediate portion to have a stipled effect. Thus, the trim strip has the appearance of an intermediate plastic portion bordered along its opposite longitudinal side edges by side portions having a shiny metallic appearance. It will be appreciated, of course, that the intermediate portion will have a color corresponding to that of the plastic material which, of course, can be varied as desired to provide a desired contrast with the metallic appearance of the side portions. Trim strips of the foregoing character generally are adhesively bonded to an underlying support surface by adhesive means interposed between the bottom face of the strip and the support surface. Mounting may, of course, be achieved by suitable mechanical fastening elements or by dielectric bonding. The particular manner of mounting is not pertinent to the present invention. Further, trim strips of the foregoing character are often provided with a thin metal member on the rear face to provide bending stability, stability against longitudinal shrinkage and/or a mounting surface for adhesives. It will be appreciated that such metal members may be provided on trim strips finished in accordance with the present invention.

FIGS. 2 and 3 of the drawing illustrate the manner in which a trim strip of the character illustrated in FIG. 1 is provided with a finished end in which the side portions of the trim strip and intermediate portion arcuately taper to a pointed end. The pointed end contour is formed by removing a portion of the trim strip material in a manner whereby uncut or remaining side portion 30 and remaining intermediate portion 32 define a recess 34 and remaining side portion 36 and remaining intermediate portion 32 define another recess 38. Recess 34 has two edges, namely edge 30a defined by the inner surface of uncut side portion 30 and edge 32a defined by the opposed surface of remaining portion 32. Similarly, recess 38 has two edges, namely, edge 36a defined by the inner surface of uncut side portion 36 and edge 32b defined by the opposed surface of intermediate portion 32. Removal of the material from the end of the trim strip to define recesses 34 and 38 may be achieved in any desired manner and, preferably, is removed by cutting. In this respect, each recess is defined by cutting the trim strip longitudinally along the line between intermediate portion 32 and the corresponding side portion of the trim strip and cutting the intermediate portion along a cut line which intersects the first cut line and extends arcuately and longitudinally therefrom and into the intermediate portion. In this embodiment, each of the cut lines in the intermediate portion extends partially thereacross and intersect laterally intermediate the side portions at a point corresponding generally with the longitudinal axis of the trim strip. Uncut end portions 30 and 36 are cut to a longitudinal length which provides for each to be displaced laterally inwardly relative to the intermediate portion 32 and to terminate in abutting engagement at the pointed or terminal end of intermediate portion 32, as illustrated in FIG. 3. It will be appreciated that terminal ends 30b and 36b of side portions 30 and 36, respectively, are tapered relative to the trim strip axis in a manner to provide for the terminal ends to be disposed in abutting relationship when the side portions are displaced inwardly of the intermediate portion.

When side portion 30 is displaced laterally inwardly relative to intermediate portion 32, recess edges 30a and 32a are brought into juxtaposed relationship. Similarly, recess edges 36a and 32b are brought into juxtaposed relationship when side portion 36 is displaced laterally inwardly of intermediate portion 32. When so displaced, side portions 30 and 36 are each interconnected with intermediate portion 32 in a manner whereby the edges therebetween are retained in the juxtaposed positions thereof. Such interconnection can be achieved in any desired manner such as by mechanically fastening the intermediate and side portions to one another or bonding the intermediate and side portions, such as by an adhesive, for example. Preferably, however, the interconnection is provided by heat sealing the juxtaposed edges of the side portions and intermediate portion. Heating of the trim strip end to facilitate displacement of the side portions or to achieve displacement and a heat sealing bond when the latter is employed can be achieved in any desired manner. The temperature required to achieve heat sealing will vary, of course, depending on the plastic material from which the trim strip is produced. It has been found that the most desirable heat sealing relationship is achieved with vinyl trim strip material when the temperature thereof is elevated to a range of from about 400° to about 450° F. Heating of the trim strip to the desired temperature can be achieved, for example by conductive heating, radiant heating, hot gas heating, induction heating or other suitable heating. Preferably, conductive heating is employed and may be achieved, for example, by the use of a heating block such as block 40 illustrated by broken lines in FIG. 2. Such a heating block is contoured to correspond with the recesses in the trim strip end and is adapted to be moved into the recesses and into close proximity with or into engagement with the recess surfaces. Block 40 may be heated in any suitable manner such as by providing electric heating electrodes in recesses 42 thereof. It will be appreciated, however, that other means of heating the block either prior to and/or during heating of the trim strip can be employed. For example, a hot fluid such as steam could be circulated through the block or the block could be heated by means separate therefrom and then moved into the trim strip recesses.

Lateral displacement of side portions 30 and 32 relative to intermediate portion 32 can be achieved in any desired manner such as by hand. Preferably, however, after the trim strip has been heated to the necessary temperature and the heating block or other heating means removed from heating relationship therewith, the side portions are displaced laterally inwardly by a pair of laterally reciprocable die elements 46 and 48 illustrated by broken lines in FIG. 3. Such die elements preferably have interfaces contoured to correspond with the arcuate taper of the finished trim strip end such as is illustrated in FIG. 3. It will be appreciated, however, that lateral displacement of the side portions by laterally reciprocating components could be achieved with any form of rod or plate element adapted to engage a corresponding one of the side portions intermediate the opposite ends of the cut line defining the inner surfaces thereof. Further, a plurality of cooperable displacing components could be provided along each side of the trim strip and operated, for example, for a first of the components to displace a longitudinally inward end of the corresponding side portion toward the intermediate portion and for another of the components to at the same time or thereafter displace the terminal end portion of the side portion toward the intermediate portion. It will be further appreciated that such lateral inward displacement of the side portions could be achieved by a longitudinally reciprocating component or components as opposed to laterally reciprocating components. Many arrangements for displacing the side portions to bring the side portions and intermediate portion into juxtaposed relationship could be devised, the illustrated arrangement merely being one possible form.

The cutting of the recesses in the trim strip end can, of course, be achieved in any desired manner and can be performed by a plurality of successive cutting operations or by a single cutting operation produced by an appropriately contoured cutting die or opposed cooperating cutting dies. Preferably, the trim strip is suitably retained in a fixed disposition such as by clamping during the cutting, heating and displacing and bonding operations, and the components employed to achieve cutting, heating and lateral displacement of the side portions are moved relative to the fixed trim strip. It will be appreciated, however, that the latter components could be retained in fixed dispositions and the trim strip moved into engagement therewith. The side portions of the trim strip preferably are maintained in engagement with the intermediate portion under pressure during the bonding operation to enhance the bond therebetween. Such pressure may result in a small amount of the plastic material of the trim strip being exuded along the lines of juncture between the side and intermediate portions. Such material will, of course, be suitably trimmed from the finished end to enhance the decorative appearance thereof. As illustrated in FIG. 3, the completed trim strip end finish in this embodiment provides a tapered end finish in which the side portions of the trim strip cooperate to define a continuous border extending about the end of the strip. Further, with a trim strip having a cross-sectional configuration providing for laterally contoured side portions and a distinctly contoured intermediate portion the bond line between each side portion and the intermediate portion blends into the contour line between the side and intermediate portions behind the contoured end finish, whereby the decorative appearance of the end finish is enhanced by avoiding any readily visible seams. Moreover, the terminal ends of the side portions, if properly tapered, have a seam therebetween in the finished end which is visible only upon a close inspection of the finished end. This too desirably adds to the decorative effect or appearance.

In FIGS. 4 and 5 of the drawing, there is illustrated yet another end contour which can readily be provided on a trim strip of the character illustrated in FIG. 1. In this respect, the trim strip is provided in the manner set forth hereinabove with recesses 50 and 52 between remaining intermediate portion 54 and remaining side portions 56 and 58, respectively. In this embodiment, recess 50 has opposed edges defined by inner surface 56a of side portion 56 and surface 54a of intermediate portion 54. Similarly, recess 52 has opposed edges defined by inner surface 58a of side portion 58 and surface 54b of intermediate portion 54. Further, the recess edges defined by surfaces 54a and 54b are arcuate and blend at the longitudinally outermost end of remaining intermediate portion 54 at a point 54c laterally intermediate the side portions to define a semi-circular edge so that the formed end finish will have a rounded contour, as illustrated in FIG. 5. Side portions 56 and 58 are cut to a length to provide for terminal faces 56b and 58b thereof to be disposed in abutting relationship when the side portions are displaced inwardly relative to intermediate portion 54. When so displaced, the side portions and intermediate portion are interconnected to complete the end finish. The cutting of the trim strip, lateral displacement of side portions 56 and 58 and the interconnection of the side portions with the intermediate portion can be achieved as described hereinabove with regard to the end finish illustrated in FIGS. 2 and 3. It will be again appreciated that the method of end finishing provides for the juxtaposed edges of the side portions and intermediate portion to blend with the lines between the side and intermediate portions behind the end finish to give a substantially seamless appearance to the end finish.

FIGS. 6 and 7 of the drawing illustrate yet another end finish contour for a trim strip of the character illustrated in FIG. 1, and which is made in accordance with principles of the present invention. In this respect, the trim strip is provided in this embodiment with a single recess 60 defined by removing a portion of the trim strip material such as by cutting the material along a first line between one of the side portions and the intermediate portion and along a second cut line intersecting the first cut line at one end and extending laterally into the intermediate portion. More particularly, the recess provides for the trim strip to have a remaining side portion 62, a remaining intermediate portion 64 and a side portion 66. Recess 60 has two edges one of which is defined by the inner surface 62a of side portion 62 and the other of which is defined by opposed inner surface 64a of remaining intermediate portion 64. The cut line extending into intermediate portion 64 to define surface 64a in this instance extends completely across the intermediate portion and terminates at the corresponding juncture between the intermediate portion and side portion 66. This structure provides for a trim strip end finish to be formed which has a straight edge along one side of the trim strip and an arcuately tapered edge along the opposite side of the trim strip which intersects with the straight edge to define the terminal end of the trim strip end finish. It will be appreciated, of course, that the cut line defining surface 64a could be of a contour other than convex relative to remaining intermediate portion 64 and could, for example, be a straight cut line or a concave cut line or a cut line having any desired contour other than straight or arcuate. The recessed trim strip end is finished to the configuration illustrated in FIG. 7 in a manner similar to that pointed out hereinabove in conjunction with the description of the embodiment illustrated in FIGS. 2 and 3. It will be appreciated that the terminal end faces 62b and 66a of side portions 62 and 66, respectively, will be contoured so that the end faces are in abutting relationship when side portion 62 and intermediate portion 64 are relatively displaced laterally to bring surfaces 62a and 64a into juxtaposed relationship. Further, as in the foregoing embodiments, the forming method provides for the trim strip to have an end finish having the appearance of an intermediate trim strip portion and a continuous marginal or side portion which is uninterrupted in extending about the periphery of the end of the strip. Again, the forming method further provides for a substantially seamless appearance in the area of the end finish.

In FIGS. 8 and 9 of the drawing, there is illustrated a further embodiment wherein a trim strip of the character illustrated in FIG. 1 is provided with an end finish having a fishtail contour formed in accordance with the present invention. In this enbodiment, the end of the trim strip is provided with a pair of recesses 70 and 72. The recesses are defined by removing a portion of the trim strip material in a manner whereby remaining side portion 74 and remaining intermediate portion 78 define recess 70 and remaining side portion 76 and remaining intermediate portion 80 define recess 72. Each of the recesses has two edges. In this respect, recess 70 has a first edge defined by inner surface 78a of remaining intermediate portion 78 and a second edge defined by inner surface 74a of remaining side portion 74. Similarly, recess 72 has a first edge defined by the inner surface 80a of remaining intermediate portion 80 and a second edge defined by inner surface 76a of remaining side portion 76. The edge defined by surface 78a intersects with one end of the edge defined by surface 74a and extends from the point of intersection laterally and longitudinally into the intermediate portion of a trim strip. Similarly, the edge defined by surface 80a intersects with one end of the edge defined by inner surface 76a and extends from the point of intersection laterally and longitudinally into the intermediate portion. Moreover, the edges extending laterally and longitudinally into the intermediate portion intersect, in the embodiment illustrated, at a point 82 which coincides generally with the longitudinal axis of the trim strip. It will be appreciated, however, that the point of intersection of these edges could be located laterally to either side of the trim strip axis.

In forming the cut trim strip end to the configuration illustrated in FIG. 9, remaining side portions 74 and 76 are displaced laterally inwardly relative to the corresponding remaining intermediate portion, and to facilitate such displacement side portion 74 is provided with a notch 84 and a side portion 76 is provided with a notch 86 both of which notches have beveled side edges angularly related relative to one another and to the corresponding surfaces 78a and 80a so that the notch surfaces, when the side portions are displaced to the positions thereof illustrated in FIG. 9, are in abutting relationship. In this embodiment, remaining side portions 74 and 76 preferably are displaced by hand to the positions illustrated in FIG. 9. As described with regard to the previous embodiments, the remaining side portions and intermediate portions are interconnected to retain the opposed edges of the side portions and intermediate portions in juxtaposed relationship. If heat sealing of the juxtaposed edges is desired, a contoured heating tool such as tool 88 illustrated by broken lines in FIG. 9 can be introduced partially into the recess followed by an unheated tool of similar contour to apply pressure to the trim strip. Alternatively, the trim strip could be otherwise heated and tool 88 employed merely to exert pressure during the heat sealing operation, in which case the tool 88 would not have to be heated. Again, it will be appreciated that the end finish illustrated in FIG. 9 provides for the trim strip to appear to have a continuous decorative edge about the periphery of the trim strip end and that an apparently seamless construction is achieved, all of which enhances the decorative appearance of the end finish.

FIGS. 10 and 11 illustrate another manner in which a trim strip of the character illustrated in FIG. 1 can be provided with a decorative end finish having a contour similar to the end finish illustrated in FIG. 3 of the drawing. In this embodiment, a portion of the trim strip material is removed to provide a recess 90 defined by remaining portions 92 and 94. Recess 90 has two edges one of which is defined by inner surface 92a of remaining portion 92 and the other of which is defined by inner surface 94a of remaining portion 94. Moreover, the edges of the recess extend laterally and longitudinally into the intermediate portion 96 of the trim strip form the corresponding side edges 98 and 100, respectively, of the trim strip, and the edges intersect at a point laterally intermediate side edges 98 and 100. Remaining portions 92 and 94 are displaced laterally inwardly relative to one another and to the longitudinal axis of the trim strip to bring surfaces 92a and 94a into juxtaposed relationship, and the portions 92 and 94 are suitably interconnected to retain the surfaces in juxtaposed relationship. Preferably, portions 92 and 94 are interconnected by heat sealing, and the lateral displacement and heat sealing operation or operations can be achieved as described hereinabove. It will be noted that an end finish formed in the foregoing manner provides for the finished end to appear to have a continuous border about the periphery thereof, and provides for a longitudinally extending seam to exist in the intermediate portion of the end finish between remaining intermediate portions 92 and 94. Such a seam, however, blends well with the color of the intermediate portion of the trim strip material and any excess plastic material which may exude therefrom during the heat-ing sealing operation can be cut or otherwise removed therefrom so that the existance of the seam is not pronounced.

In all of the foregoing embodiments, the end finishes formed in accordance with the present invention have been illustrated in conjunction with a trim strip having a cross-sectional configuration defining an intermediate trim strip portion bordered by relatively narrower visibly distinct side portions. It is to be noted, however, that the principles of the present invention are in no way limited to the forming of the specific trim strip end finish contours illustrated or to the forming of end finishes on a trim strip having such a structural contour. In this respect, end finishes of the foregoing configurations and others can be provided on a trim strip having structural characteristics such as those of the trim strip illustrated in FIG. 12 of the drawing. In this respect, a trim strip 110 is illustrated in FIG. 12 which is comprised of a plastic body portion 112 having an outer surface contoured to define laterally adjacent, outwardly and downwardly inclined portions 114 and 116 and corresponding downwardly and outwardly inclined portions 118 and 120. It will be appreciated that the contoured outer surface of the trim strip could be provided with any suitable decorative means such as an integral impressed pattern or overlying decorative film means. In the embodiment illustrated, the outer surface is covered laterally by a thin film of metallized polyethylene terephthalate, whereby the trim strip has the appearance of a polished metal strip.

It will be appreciated that a trim strip of the structure illustrated in FIG. 12 does not have distinctly apparent intermediate and side portions as does the trim strip illustrated in FIG. 1. The intermediate and side portions for a trim strip of the character illustrated in FIG. 12 are defined by imaginery longitudinal lines spaced laterally inwardly from the longitudinal side edges of the strip such as, for example, lines 126 and 128. The lateral position of such lines relative to the side edges of the strip will vary depending on such factors as the contour of the outer surface of the strip, the lateral width of the strip and the configuration of the end finish to be formed. FIGS. 13 and 14 of the drawing illustrate the manner in which the trim strip of FIG. 12 can be formed in accordance with the present invention to define an end finish in which the longitudinal side portions of the trim strip taper arcuately inwardly of the longitudinal axis of the trim strip to define a pointed end finish.

As illustrated in FIG. 13, a portion of the material of the trim strip is removed to provide recesses 130 and 132 defined, respectively, by remaining side portion 134 and remaining intermediate portion 136 and by remaining side portion 138 and remaining intermediate portion 136. Side portions 134 and 138 are adapted to be displaced laterally inwardly relative to the trim strip axis, and each recess has two edges which are brought into juxtaposed relationship by such displacement of the side portions. More particularly, recess 130 has side edges defined by inner surface 134a of side portion 134 and outer surface 136a of intermediate portion 136, and recess 132 has edges defined by inner surface 138a of side portion 138 and outer surface 136b of intermediate portion 136. Lateral displacement of the side portions and interconnection thereof with intermediate portion 136 is achieved in the manner described hereinabove with regard to the earlier embodiments. The completed end finish is illustrated in FIG. 14 and it will be noted that seams exist between the juxtaposed faces of the side portions and intermediate portion. However, if the cuts employed in forming the recesses are sharply defined such seams will not be readily visible and the existence thereof will not be pronounced. Although only one end finish configuration is illustrated, it will be appreciated that other end configurations including those illustrated hereinabove can readily be formed for such a trim strip structure.

The versatility provided in the forming of trim strip end finishes in accordance with the present invention is further demonstrated in FIGS. 15–17. In this respect, a trim strip structure is illustrated in FIG. 15 having a cross-sectional contour configured to provide longitudinally extending side portions and an intermediate portion which are readily distinguishable. The trim strip structure in this embodiment, however, distinguishes from the trim strip illustrated in FIG. 1 in that the intermediate portion is laterally narrow and the side portions are relatively wide in comparison therewith. In this respect, with reference to FIG. 15, a trim strip 140 is illustrated which is comprised of a plastic body portion 142 having a concave outer surface 144 provided substantially centrally therewith with a longitudinally extending outwardly projecting plastic bumper 146 which may be integral with or separate from and bonded to body portion 142. Bumper 146 and the underlying portion of the material of body 142 define an intermediate portion of the trim strip and the portions of material of body 142 along laterally opposite sides of bumper 146 define side portions readily distinguishable from the intermediate portion by the line of juncture between the bumper and the outer surface of the body portion. In the embodiment illustrated, the outer surfaces of the side portions of the trim strip are covered with corresponding films of metallized polyethylene terephthalate 148. Thus, the trim strip has the appearance of a polished metal strip carrying an intermediate laterally narrow protective plastic bumper.

The trim strip illustrated in FIG. 15 can be formed to provide many end finish configurations including those described hereinabove, and FIGS. 16 and 17 are illustrative of the manner in which the trim strip can be formed to provide a pointed end finish. In this respect, a portion of the trim strip material is removed to provide recesses 150 and 152 defined, respectively, by remaining side portion 154 and remaining intermediate portion 156 and by remaining side portion 158 and remaining intermediate portion 156. Further, recesses 150 and 152 each have two side edges, the side edges of recess 150 being defined by inner surface 154a of side portion 154 and outer surface 156a of intermediate portion 156 and the sides of recess 152 being defined by inner surface 158a of side portion 158 and outer surface 156b of intermediate portion 156. Side portions 154 and 158 are adapted to be laterally displaced inwardly relative to the longitudinal axis of the trim strip to bring the opposed recess surfaces into juxtaposed relationship, and the terminal ends of side portions 154 and 158 are appropriately tapered longitudinally for the faces 154b and 158b thereof to be disposed in juxtaposed relationship upon lateral displacement of the side portions. Upon lateral displacement of the side portions, the side portions and intermediate portions are interconnected as described hereinabove and preferably are heat sealed to retain the opposed surfaces of the side portions and intermediate portion in juxtaposed relationship.

In many of the embodiments described herein, the side portions are illustrated as being of equal length so as to abut laterally centrally of the intermediate portion. It will be appreciated, however, that one of the side portions could be of a length to along extend completely around the contoured intermediate portion from the corresponding side of the strip and into abutting relationship with the side portion on the other side of the strip.

The principles of the present invention have been described herein in sufficient detail to enable others to clearly understand the invention upon a reading of the disclosure. As many possible embodiments of the present invention may be made and as many possible changes may be made in the embodiments herein described, it is to be distinctly understood that the foregoing descriptive matter is to be interpreted merely as illustrative of the present invention and not as a limitation.

I claim:

1. A decorative plastic trim strip mountable on an underlying surface comprising, an elongated extrusion of synthetic plastic having a longitudinally extending intermediate portion and side portions integral therewith and extending longitudinally along the opposite sides of said intermediate portion, said intermediate portion and said side portions in cross-section having a common bottom surface and corresponding outer surfaces spaced above said bottom surface, the outer surfaces of said side portions having laterally spaced apart inner and outer edges, the inner edges of said outer surfaces of said side portions being laterally spaced apart and intersecting the outer surface of said intermediate portion at an angle to provide laterally spaced apart visible lines in juncture between said intermediate and side portions, the cross-sectional contours of said side portions being identical, said intermediate portion having an end including a planar end face perpendicular to said common bottom surface and intersecting said bottom surface and the outer surface of said intermediate portion, said end face of said intermediate portion extending laterally from a first point on the line of juncture between one of said side portions and said intermediate portion to a second point on the line of juncture between the other of said side portions and said intermediate portion, at least one of said side portions extending continuously and uninterruptedly about the corresponding one of said first and second points and laterally along said end face of said intermediate portion, said one side portion having a planar inner surface extending perpendicular from said common bottom surface and intersecting the corresponding one of said lines of juncture, said inner surface being in juxtaposed facially engaging relationship with said end face of said intermediate portion, said one side portion further having a terminal end including an end face spaced from said corresponding point in the direction toward the other of said first and second points, the other of said side portions having a terminal end including an end face in juxtaposed facial engagement with respect to the end face of said one side portion, and means bonding said inner surface of said one side portion to said end face of said intermediate portion whereby said side portions define a border extending longitudinally along opposite sides of said intermediate portion and around said end of the intermediate portion, said border having just one line of juncture thereacross defined by said juxtaposed end faces of said side portions.

2. The trim strip according to claim 1, and decorative means on said outer surfaces of at least said side portions, said decorative means on said side portions being identical in appearance and contrasting in appearance with the appearance of the outer surface of said intermediate portion.

3. The trim strip according to claim 2, wherein said decorative means on said outer surfaces of said side portions are films of metallized transparent plastic bonded to said outer surfaces of the side portions.

4. The trim strip according to claim 1, wherein said end face of said intermediate portion includes first and second curved end face portions perpendicular to said common bottom surface and extending laterally inwardly respectively from said first and second points and intersecting along a line of juncture in said intermediate portion, each of said side portions extending uninterruptedly about the corresponding one of said first and second points and laterally along the corresponding one of said first and second end face portions, each of said side portions having an inner surface in juxtaposed facially engaging relationship with said corresponding one of said first and second end face portions, said line of juncture across said border coinciding with said line of juncture in said intermediate portion, and means bonding the inner surface of each of said side portions to the corresponding one of said first and second end face portions.

5. The trim strip according to claim 4, wherein said line of juncture in said intermediate portion and said line of juncture across said border are located centrally of said intermediate portion.

6. The trim strip according to claim 5, and a film of metallized polyethylene terephthalate bonded to each of said outer surfaces of said side portions, said outer surface of said intermediate portion of said body contrasting in appearance with said metallized films.

* * * * *